US006069646A

United States Patent [19]

Okabe et al.

[11] Patent Number: 6,069,646

[45] **Date of Patent: *May 30, 2000**

[54] IMAGE FORMING APPARATUS PROVIDING FRAME SUPPORT FOR AN OPTICAL SCANNING UNIT

[75] Inventors: Kouichi Okabe; Yasuhide Saito; Hiromitsu Koizumi, all of Iwatsuki, Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/918,269

[22] Filed: Mar. 24, 1997

Related U.S. Application Data

[63] Continuation of application No. 08/338,146, Nov. 9, 1994, abandoned.

[30] Foreign Application Priority Data

Nov. 10, 1993 [JP] Japan .................................... 5-280887

[51] Int. Cl.[7] ............................ B41J 2/47; G01D 15/34; G02B 26/00; G02B 27/00

[52] U.S. Cl. ............................................................ 347/257

[58] Field of Search .................................... 347/256, 233, 347/257, 242, 138, 139; 399/297, 298, 302, 308

[56] References Cited

U.S. PATENT DOCUMENTS

| | | |
|---|---|---|
| 5,198,240 | 3/1993 | Baxi . |
| 5,317,444 | 5/1994 | Iwasaki . |
| 5,331,373 | 7/1994 | Nomura et al. . |

FOREIGN PATENT DOCUMENTS

| | | |
|---|---|---|
| 4-247466 | 9/1992 | Japan . |
| 5-66621 | 3/1993 | Japan . |

*Primary Examiner*—John Barlow
*Assistant Examiner*—Raquel Yvette Gordon
*Attorney, Agent, or Firm*—Finnegan, Henderson, Farabow, Garrett & Dunner, L.L.P.

[57] ABSTRACT

An image forming apparatus providing frame support for an optical scanning unit and related image forming elements is formed of resin containing less than 10% glass fibers and includes reinforcement formations having a continuous hollow interior to increase rigidity while reducing weight. The apparatus is substantially box-like with ribbed surface for mounting a laser beam scanning unit and upright walls for mounting a drive unit are formed with ribs extending from thick wall portions.

7 Claims, 8 Drawing Sheets

IMAGE FORMING APPARATUS PROVIDING FRAME SUPPORT FOR AN OPTICAL SCANNING UNIT

This is a continuation of application Ser. No. 08/338,146, filed Nov. 9, 1994, now abandoned.

BACKGROUND OF THE INVENTION

1. Field of the Invention

The present invention relates to an image formation apparatus for forming an electrostatic latent image on a photosensitive body by exposing the photosensitive body to a scanned laser beam, and forming an image corresponding to the laser beam by developing the electrostatic latent image.

2. Description of the Related Art

As an image formation apparatus using an electrophotographic process, a laser printer is generally used. The laser printer includes a laser beam scanning unit for emitting a laser beam according to an image signal, a photosensitive drum on which an electrostatic latent image is formed by the emission of a laser beam, and processing members for applying processes of electrifying, developing and cleaning the photosensitive drum. In this laser printer, image formation is made by emitting a laser beam according to an image signal; exposing the uniformly electrified photosensitive drum to the scanned laser beam for forming an electrostatic latent image according to the image signal, and sticking toner or the like on the photosensitive drum thus forming a toner image. The toner image thus formed on the photosensitive drum is transferred and fixed on a recording paper sheet or the like.

In general, such a laser beam printer includes a safety interlock. When a cover of the printer is opened, the safety interlock acts in co-operation with the cover to shield a space between a photosensitive drum and the opening of the cover by means of a shutter, or to stop the operation of a laser beam scanning unit. During maintenance or the like of the printer, the safety interlock prevents an operator from being exposed to the laser beam leaked from the printer.

As laser beam printers have been significantly spread in recent years, there have been strong demands toward miniaturization. To meet these demands, attempts have been made to substantially simplify the internal structure of the printer. Specifically, there have been commercially available laser beam printers of a type using a cartridge (EP cartridge) integrally containing a developing unit for containing toner; cleaning unit and electrifying unit for removing or imparting electrostatic charge thereby preparing a state where an electrostatic latent image can be formed; and a photosensitive drum. In this laser beam printer, the main maintenance can be performed only by removing the EP cartridge, thus improving the operability of the printer.

Even in the laser beam printer simplified in the internal structure, each of functional parts must be mounted with a high accuracy for obtaining an image with a high quality. To cope with this requirement, in some printer, a frame to which each of functional parts is mounted is made of a resin having a high rigidity such as polycarbonate containing glass fiber in an amount of from 30 to 50 wt %.

Moreover, to mount the EP cartridge at an accurate position, a cover which is opened/closed upon mounting/dismounting the EP cartridge, is also increased in its strength for pressing the EP cartridge mounted in the frame.

However, in the case where glass fiber is contained in a resin for increasing the rigidity of a frame and a cover made of the resin, there occurs a problem in damaging the surface of a die during molding. This increases the wear of a die for molding a frame of a laser beam printer, and also causes an inconvenience in the quality of the appearance of the finished frame and thereby the frame is required to be covered with a casing thus obstructing the reduction in the manufacturing cost.

Moreover, a resin containing glass fiber is increased in weight more than a resin with no glass fiber (for example, the addition of glass fiber in polycarbonate in an amount of 30 wt % increases the weight by about 1.43 times). This makes it difficult to reduce the weight of a printer reduced in size.

SUMMARY OF THE INVENTION

An object of the present invention is to provide an image formation apparatus capable of suppressing the manufacturing cost and reducing the weight.

To achieve the above object, according to a first aspect of the present invention, there is provided an image formation apparatus for forming an image by emitting a laser beam from a laser beam scanning unit to a photosensitive body around which a plurality of processing members are disposed, the improvement wherein a frame for containing and holding each part of the laser beam scanning unit, a plurality of processing members and the photosensitive body, is formed of a resin containing glass fiber in an amount of 10 wt % or less;

a thick portion is provided for reinforcement at a specified section of the frame and a rib is provided for reinforcement at a position where each of the parts is mounted; and a continuous cavity is formed in the thick portion and the rib.

According to a second aspect of the present invention, there is provided an image formation apparatus described in the first aspect, wherein the cavity is formed by injecting a fluid in the frame at a specified pressure and then removing the fluid.

According to a third aspect of the present invention, there is provided an image formation apparatus described in the first aspect, wherein the frame is formed by joining wall surface members; the thick wall portion is provided along the joint portion between the wall surface members forming the frame; and a boss portion or hole portion for mounting a part is formed on the leading edge portion of the thick wall portion along the frame.

According to a fourth aspect of the present invention, there is provided an image formation apparatus described in the first aspect, which further comprises a photosensitive body cartridge having a first shading member for containing the photosensitive body together with at least one of a plurality of the processing members, wherein the frame is formed integrally with a second shading member for shielding a laser beam from the laser beam scanning unit to the photosensitive body in co-operation with the first shading member when the photosensitive body cartridge is mounted at a specified position; and a rib containing the cavity is formed in the vicinity of the second shading member.

According to a fifth aspect of the present invention, there is provided an image formation apparatus described in the fourth aspect, wherein a guiding/holding portion for guiding and holding the photosensitive body cartridge at a specified position within the frame, is projectingly provided on the inner wall of the frame; and the cavity is provided in the guiding/holding portion.

According to a sixth aspect of the present invention, there is provided an image formation apparatus described in the fifth aspect, wherein the guiding/holding portion includes a guide groove for guiding the photosensitive body cartridge in the mounting and ejecting directions, and a holding portion formed in the guide groove at the edge portion in the mounting direction of the photosensitive body cartridge;

a projecting portion is formed on the frame on the position opposed to the end portion in the mounting direction of the photosensitive body cartridge held in the holding portion; and a biasing means is provided adjacently to the holding portion for containing and holding by the biasing force the photosensitive body cartridge guided in the holding portion, and biasing the photosensitive body cartridge in the ejecting direction when the photosensitive body cartridge is abutted against the projecting portion and the end portion of the photosensitive body cartridge on the ejecting side is lifted against the biasing force.

According to a seventh aspect of the present invention, there is provided an image formation apparatus described in any of the fourth aspect to the sixth aspect, wherein the photosensitive body cartridge includes a first case disposed on side end portion in the mounting direction relative to the second shading member; and a second case disposed on the ejecting side and is turnably connected to the first case; and a biasing member for biasing the first and second shading members in such a manner as to hold the second shading member therebetween.

In the image formation apparatus according to the first aspect of the present invention, a frame is formed of a resin containing glass fiber in an amount of 10% or less. The resin containing glass fiber in an amount of 10% or less does not damage a die during molding, thereby reducing the molding cost of the frame. However, such a resin substantially with no glass fiber reduces the rigidity of the frame. To prevent the reduction in the rigidity of the frame, thick wall portions and ribs are provided, and further a continuous cavity is formed in the thick wall portions and the ribs. By forming the cavity in the thick wall portions and the ribs, there can be obtained the so-called closed sectional structure without reduction of the wall thickness of the frame, which is effective to further strengthen the frame.

Each of the parts can be accurately mounted to the portion of the frame where the strong rib is formed, to thus prevent the reduction in quality of an image. Moreover, a resin containing glass fiber in an amount of 10 wt % or less is effective not to damage the appearance of the frame.

In the image formation apparatus according to the second aspect of the present invention, a fluid is injected in a frame at a specified pressure upon molding and is removed after molding, thus forming a cavity. In the case where the thickness of a resin is changed by provision of thick wall portions and ribs, the resin at the thick wall portion is drawn by the resin at the thin wall portion, resulting in the generated shrinkage. However, in the present invention, a fluid is injected in the thick wall portions and ribs at a specified pressure for increasing the pressure within the resin, so that the resin is pressed against the surface of a die, to prevent the generation of shrinkage, thereby improving the quality in the appearance of the frame.

Each of the parts can be accurately mounted near the rib which is enhanced in the strength and in the molding accuracy. In addition, a boss for mounting a part may be projectingly provided near the rib and the part may be mounted to the boss. Additionally, the formation of a specified cavity in the frame by injecting a fluid in a resin during molding is made using the known gas-assist method.

In the image formation apparatus according to the third aspect of the present invention, a thick wall portion is formed at a joint portion between wall surface members, and a boss portion for mounting a part is formed at the leading edge of the thick wall portion along the wall surface member. This is effective to strengthen the boss portion. Moreover, by forming the boss portion through injecting a fluid in the thick wall portion at a specified pressure, it becomes possible to mount a part to the boss portion at the accurate position.

The simple projection of a boss portion from a wall surface partially increases the wall thickness of a frame, which causes shrinkage in the frame, or which allows the load of a part supported by the boss portion to be concentrated at a narrow interface between the boss portion and the wall surface. The present invention solves this problem, that is, enables a part to be strongly mounted without any damage to the shape of the frame.

In the image formation apparatus according to the fourth aspect of the present invention, processing members for forming an image are integrally provided in a photosensitive body cartridge together with a photosensitive body for simplifying the internal structure of the apparatus and reducing the size thereof. In this image formation apparatus, by mounting the photosensitive body cartridge at a specified position, the optical path of a laser beam between a laser beam scanning unit and the photosensitive body is shielded by a first shading member covering the photosensitive body and a second shading member formed in the frame.

A rib containing a cavity may be provided around the surface on which the second shading member is mounted for reinforcing the periphery of the second shading member. The molding accuracy of the second shading member can be also enhanced by injecting a fluid in the rib at a specified pressure, which enables the perfect shielding of a laser beam.

Since the optical path of a laser beam is shaded in the frame, the leakage of a laser beam can be prevented without provision of a shutter interlocking with an opening/closing cover in the apparatus, thus significantly simplifying the internal structure of the apparatus.

In the image formation apparatus according to the fifth aspect of the present invention, a frame is integrally formed with a guiding/holding portion for guiding and holding a photosensitive body cartridge at a specified position. The rib for the guiding/holding portion contains a cavity in the same manner as in the thick wall portion, so that the shape of the guiding/holding portion can be finished with a high accuracy. This makes it possible to certainly mount and hold a photosensitive body at a specified position, and hence to make easy the mounting of the photosensitive body without harming the shading performance of the interior of the apparatus, resulting in the improved operability upon maintenance.

In the image formation apparatus according to the sixth aspect of the present invention, when a photosensitive body cartridge is inserted along a guide groove in the mounting direction, the photosensitive body cartridge is guided and contained in a holding portion by a biasing/holding means, and further held therein by the biasing force thereof. This brings about, for example, a comfortable insertion feeling upon mounting of the photosensitive body cartridge. Moreover, this eliminates the necessity to press the photosensitive cartridge by a cover or the like when the photosensitive body cartridge is held at a specified position, thereby eliminating the necessity of strengthening the cover and a hinge for supporting the cover.

Moreover, when the end portion in the ejecting direction of the photosensitive body cartridge against the biasing force of the biasing/holding means for taking out the photosensitive body cartridge, the photosensitive body cartridge is allowed to abut a projecting portion provided on the frame and can be lifted using the projecting portion as a fulcrum, so that even the photosensitive body cartridge having a large weight can be lifted with a relatively light force. At this time, the biasing/holding means gives the biasing force to the photosensitive body cartridge so as to press it out of the holding portion, and thereby the photosensitive body cartridge can be simply removed.

In the image formation apparatus according to the seventh aspect of the present invention, a photosensitive body cartridge is divided into a first case and second case which are turnably connected to each other. When the photosensitive body cartridge is mounted in a holding portion, a second shading member is held by the first and second cases. This makes it possible to certainly engage the photosensitive body cartridge with the second shading member.

By separating the first and second cases from each other against the biasing force upon taking out the photosensitive body cartridge, the photosensitive body cartridge can be simply and certainly removed from the second shading member.

DETAILED DESCRIPTION OF THE PREFERRED EMBODIMENT

Hereinafter, an embodiment of the present invention will be described in detail with reference to the drawings.

Figure 1:
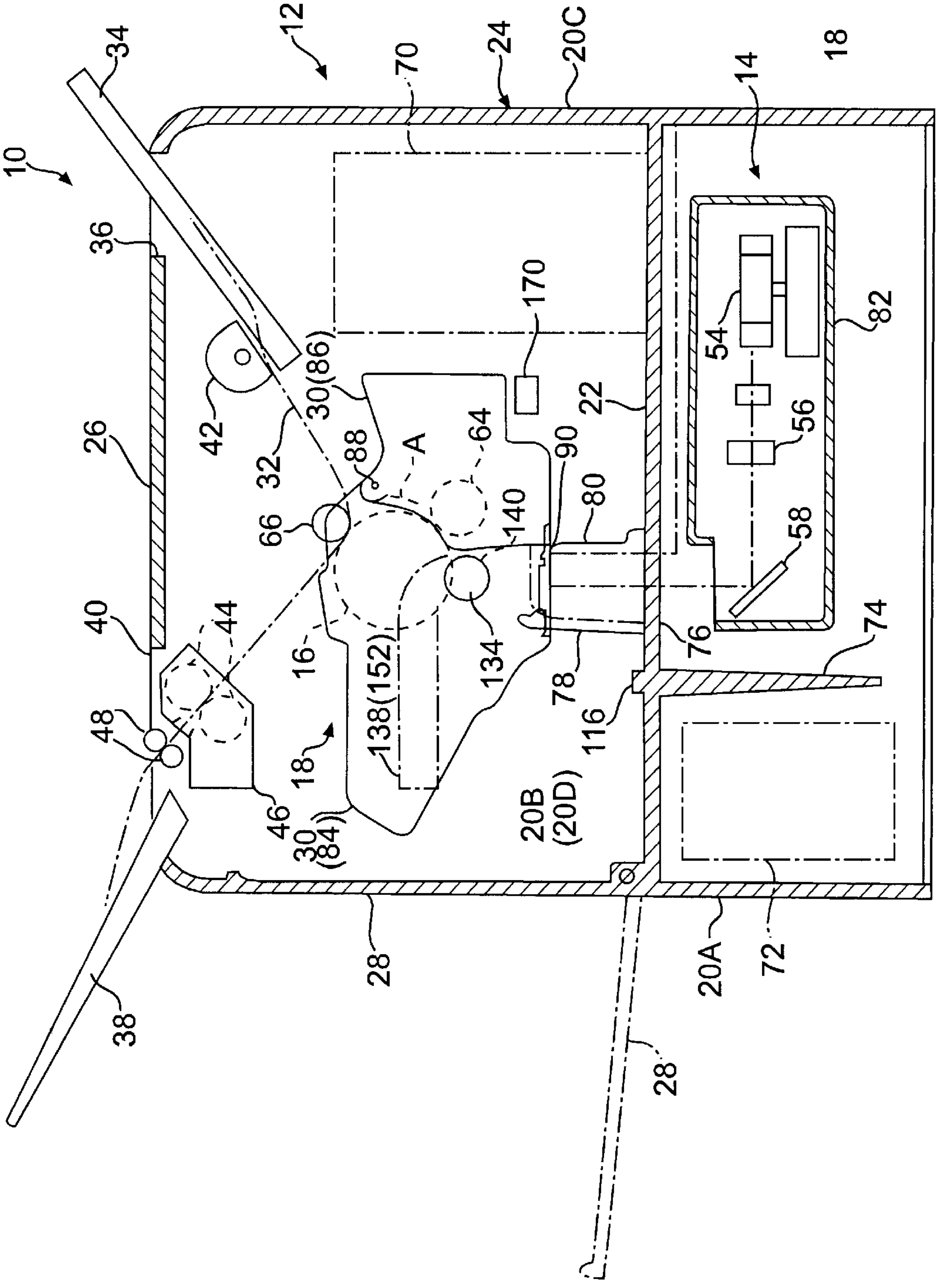
FIG. 1 is a schematic side view showing the construction of a laser beam printer of the present invention.

Referring to FIG. 1, there is shown the schematic construction of a laser beam printer 10 used in this embodiment as an example of an image formation apparatus. In the laser beam printer 10, a laser beam scanning unit 14 is disposed in a casing 12 which is substantially shaded. Into the casing 12, an EP cartridge 18 is further mounted. The EP cartridge 18 integrally includes a photosensitive drum 16 to be exposed to a laser beam emitted from the laser beam scanning unit 14, and a plurality of processing members for forming a specified image on the photosensitive drum 16.

Figure 2:
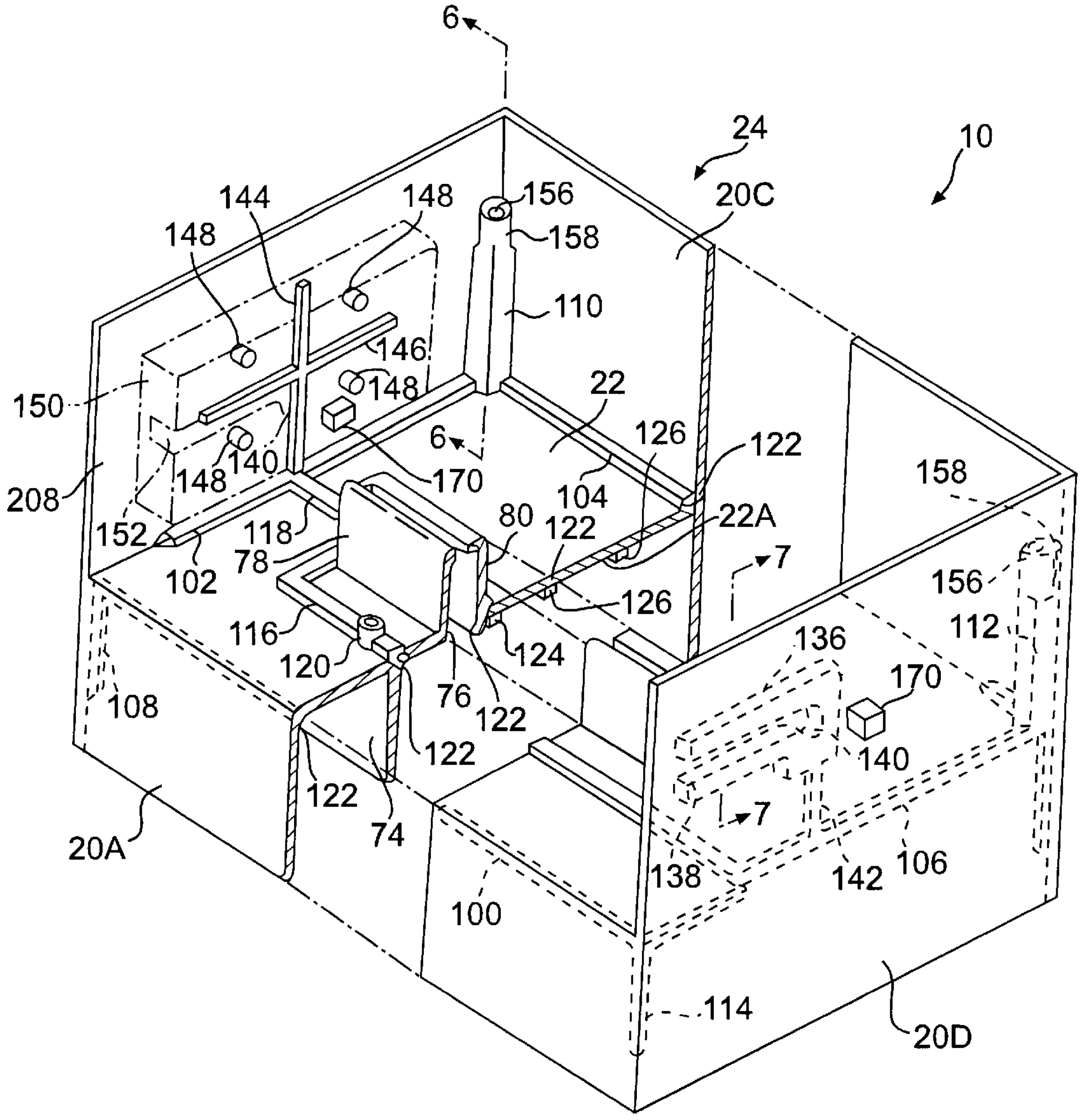
FIG. 2 is a schematic perspective view of a frame.

The casing 12 is mainly formed of a substantially box-like frame 24 with the upper portion and part of one side portion being opened, a cover portion 26 for covering the upper opening of the frame 24, and an opening/closing cover 28 provided on the opening of the opened side portion in such a manner as to be openable. As shown in FIG. 2, the frame 24 has an upright wall 20A on the side of the opening/closing cover 28. Upright walls 20B and 20D are disposed on both the sides of the upright wall 20A, and an upright wall 20C is disposed on the opposed side of the upright wall 20A. A bulkhead 22 is integrally hung on the upper end portion of the upright wall 20A and the vertically immediate portions of the upright walls 20B, 20C and 20D. The bulkhead 22 is integrally formed with a partitioning wall 74 which extends downward in parallel to the upright wall 20A and serves to reinforce the bulkhead 22.

In this embodiment, the frame 24 is molded of a common thermoplastic resin such as polycarbonate, ABS or mixed resin thereof. Such a resin contains glass fiber or the like for increasing the rigidity of a molded product in an amount of 10% or less (that is, substantially contains no glass fiber). This prevents the surface of a die from being damaged by the glass fiber contained in the resin, and thus prolongs the depreciation cycle of the die.

As shown in FIG. 1, the bulkhead 22 has an opening 76 on the side of the upright wall 20C relative to the partitioning wall 74 for permitting the passing of a laser beam. Shading walls 78 and 80, each having a specified height, are provided in such a manner as to project from the periphery of the opening 76. The detail structure of the frame 24 will be described later.

Figure 3:
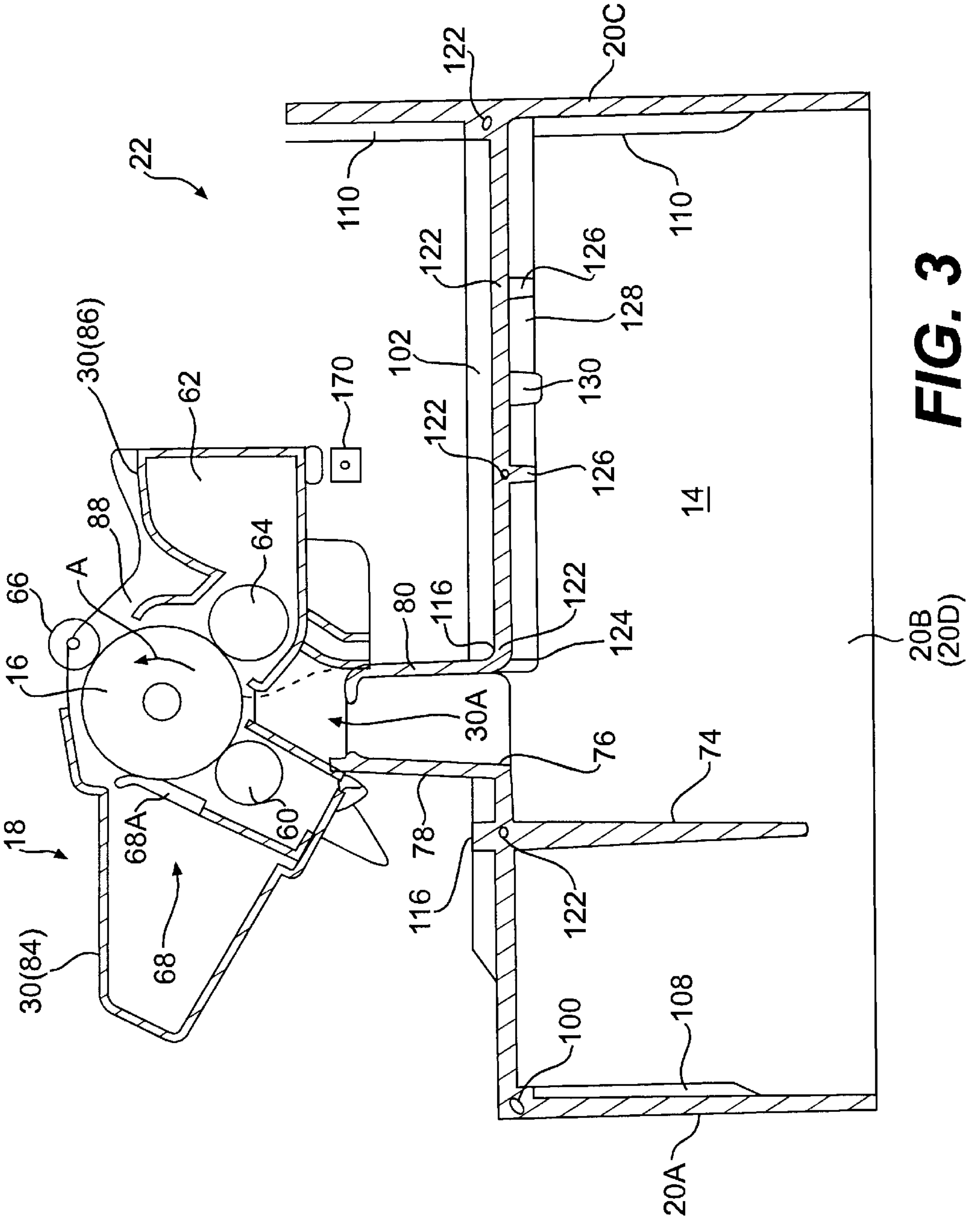
FIG. 3 is an enlarged sectional view of an EP cartridge showing the mounting state.

The laser beam scanning unit 14 is mounted on the back surface of the frame 24 at a position between the partitioning wall 74 and the upright wall 20C. The EP cartridge 18, which is inserted in the frame 24 by opening the opening/closing cover 28, is mounted at a position over the bulkhead 22. As shown in FIG. 3, the EP cartridge 18 includes a shading case 30. The photosensitive drum 16 is disposed in the shading case 30 at the central portion such that the upper and lower portions of the photosensitive drum 16 are opened from the shading case 30. A recessed portion 30A is formed on the lower portion of the shading case 30 in such a manner as to come near the side of the photosensitive drum 16. The upper end portions of the shading walls 78 and 80 projecting from the bulkhead 22 is adapted to enter into the recessed portion 30A and to abut the shading case 30 at the specified positions.

This makes it possible to shade the optical path of a laser beam emitted from the laser beam scanning unit 14 to the photosensitive drum 16 in the shading case 30 of the EP cartridge 18 by way of the opening 76 and the space between the shading walls 78 and 80.

As shown in FIG. 1, on the upper cover 26 for covering the upper portion of the frame 24, there are provided a paper supply port 36 for mounting a paper supply tray 34 storing recording paper sheets 32, and a paper discharge port 40 for mounting a paper discharge tray 38 to which the recording paper sheets 32 already recorded are stored. A semicircular paper supply roller 42 is disposed near the paper supply port 36 for feeding each of the recording paper sheets 32 stored in the paper supply tray 34 to the EP cartridge 18. A fixing unit 46 including a pair of fixing rollers 44 for heating the recording paper sheet 32 at a specified temperature, and a pair of paper discharge rollers 48 are provided near the paper discharge port 40. The recording paper sheet 32 fed from the EP cartridge 18 is held and heated between the fixing rollers 44 of the fixing unit 46, and is then fed to the paper discharge tray 38 by the paper discharge rollers 48.

Figure 8:
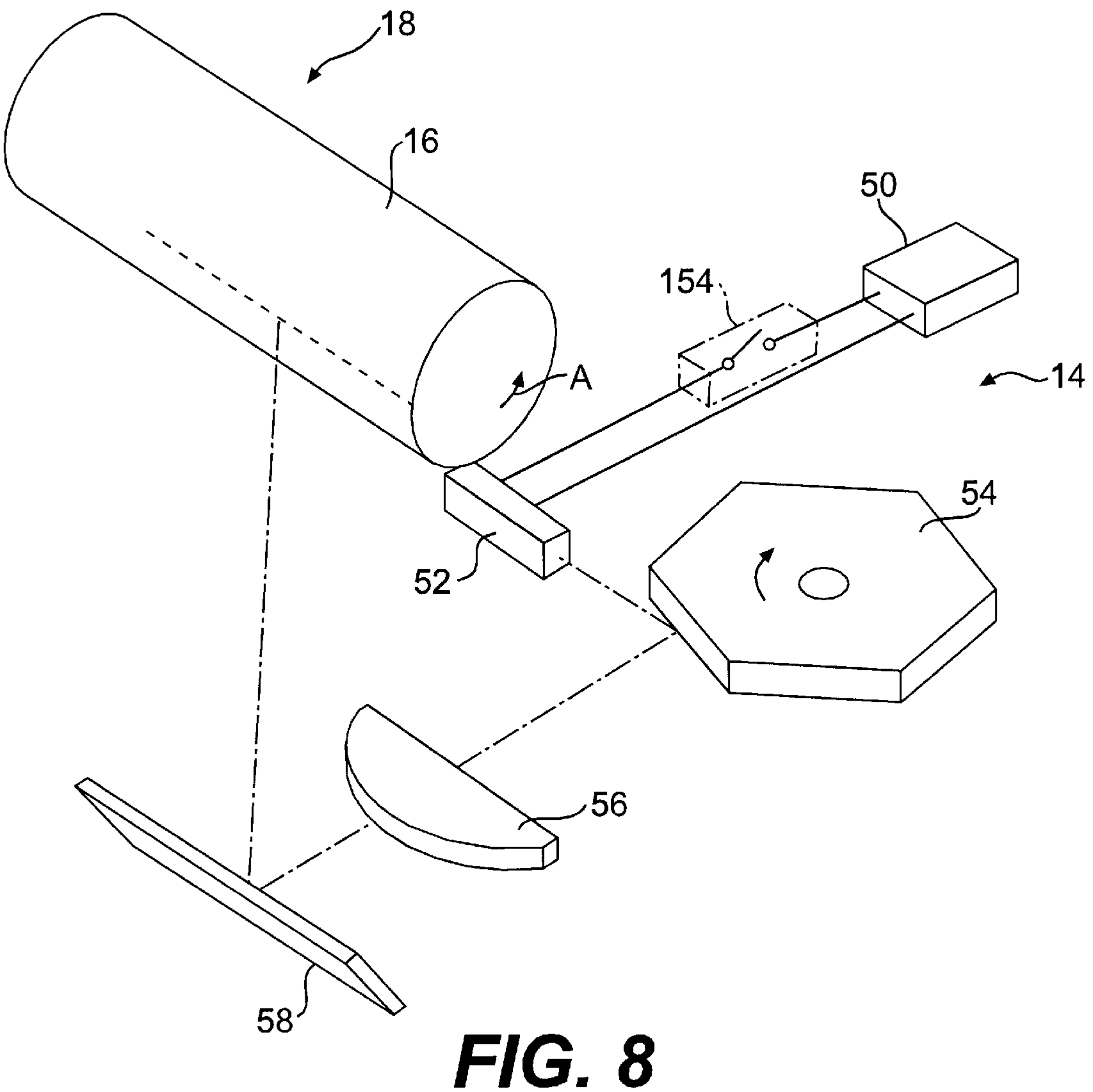
FIG. 8 is a block view showing the schematic construction of a laser beam scanning unit.

As shown in FIGS. 1 and 8, the laser beam scanning unit 14 has, in the shading case 82, a laser drive circuit 50, a semiconductor laser 52, a polygonal mirror 54, an fθ lens 56 and a reflection mirror 58. The laser drive circuit 50 outputs a drive signal modified on the basis of an image signal to the semiconductor laser 52. The semiconductor laser 52 emits a laser beam to the polygonal mirror 54 in accordance with the drive signal from the laser drive circuit 50. The polygonal mirror 54 is rotated at a specified velocity and emits the laser beam from the semiconductor laser 52 to the fθ lens 56 while changing the reflection direction (main scanning direction) of the laser beam according to the rotation. The fθ lens 56 polarizes the laser beam and emits it to the reflection mirror 58. The reflection mirror 58 reflects the laser beam and emits it to the photosensitive drum 16. The photosensitive drum 16 is rotated in the specified sub-scanning direction (the direction of the arrow A shown in FIG. 1). On the outer peripheral portion of the photosensitive drum 16, electrostatic latent images are sequentially formed by the laser beam scanned in the main scanning direction.

As shown in FIG. 3, in the shading case 30 of the EP cartridge 18, an electrifying device 60 is provided on the upstream side in the rational direction (direction of the arrow A) of the photosensitive drum 16 relative to the recessed portion 30A. The electrifying device 60 uniformly electrifies the outer peripheral portion of the opposed photosensitive drum 16. The electrified outer peripheral portion of the photosensitive drum 16 is then moved to the position at which a laser beam is to be emitted, and is exposed to a laser beam emitted from the laser beam scanning portion 14.

In the shading case 30, a development unit 62 is also provided on the downstream side in the rotational direction of the photosensitive drum 16 relative to the recessed portion 30A. The development unit 62 imparts electrified toner from a toner supply mechanism (not shown) to the outer peripheral portion of the photosensitive drum 16 by way of a development roller 64 for forming a toner image corresponding to the electrostatic latent image on the photosensitive drum 16.

As shown also in FIG. 1, in the development unit 62, a transfer roller 66 is provided on the downstream side in the rational direction of the photosensitive drum 16 in such a manner as to be partially exposed from the shading case 30. Between the transfer roller 66 and the photosensitive drum 16, the recording paper sheet 32 is supplied from the paper supply tray 34 by means of the paper supply roller 42. The transfer roller 66 holds the recording paper sheet 32 in co-operation with the photosensitive drum 16 at a specified pressure. The transfer roller 66 acts to transfer the toner stuck on the peripheral surface of the photosensitive drum 16 to the recording paper sheet 32, and to feed the recording paper sheet 32 formed with a toner image to the fixing unit 46. The recording paper sheet 32 fed to the fixing unit 46 is held and heated by the fixing rollers 44 such that the toner image is fixed, and is then discharged.

As shown in FIG. 3, a cleaning unit 68 is provided between the transfer roller 66 and the electrifying device 60. The cleaning unit 68 removes the toner remaining on the peripheral surface of the photosensitive drum 16 by a cleaning blade 68A after completion of the transfer of toner on the recording paper sheet 32. The outer peripheral portion of the photosensitive drum 16 after passing through the cleaning unit 68 is positioned to be opposed to the electrifying device 60 again and is electrified for the next exposure. In addition, a charge removing device may be provided in the cleaning unit 68 for uniformly removing the electric charge remaining on the outer peripheral portion of the photosensitive drum 16.

Figure 4:
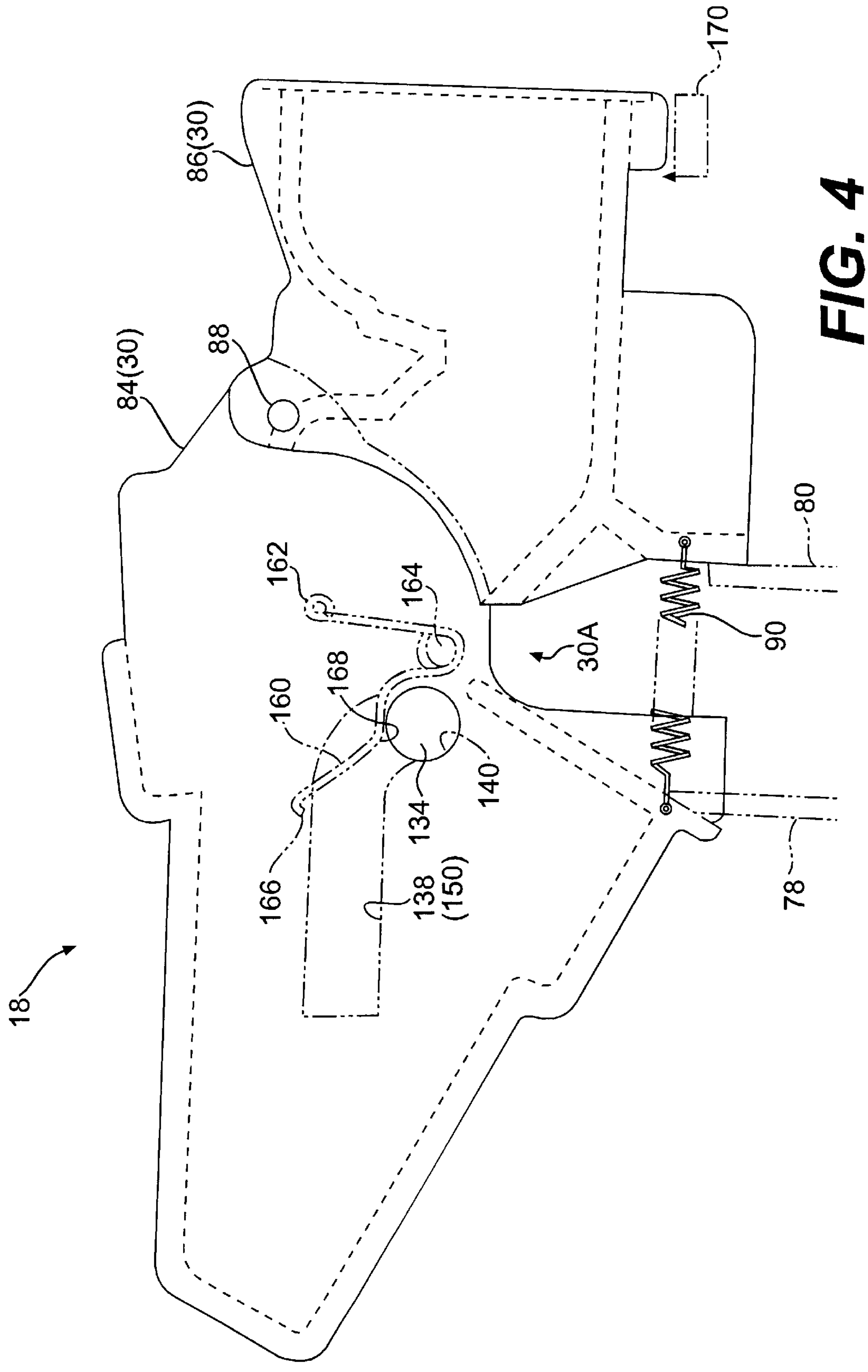
FIG. 4 is a schematic view showing the construction of an EP cartridge of the present invention.

As shown in FIG. 4, the shading case 30 of the EP cartridge 18 is divided into a photosensitive body case 84 for containing the photosensitive drum 16, and the electrifying device 60, cleaning unit 68 and transfer roller 66 of the processing members disposed around the photosensitive drum 16; and a development unit case 86 for containing the development unit 62. The photosensitive body case 84 and the development unit case 86 are connected to each other by means of a connecting pin 88 near the transfer roller 66 in such a manner as to be turnable around the connecting pin 88.

A tensile coil spring 90 is provided between the photosensitive body case 16 and the development unit case 86. The tensile coil spring 90 biases the photosensitive body case 84 and the development unit case 86 in the mutually approaching direction while putting the recessed portion 30A therebetween. Accordingly, the photosensitive body case 84 and the development unit case 86 are biased by the biasing force of the tensile coil spring 90 in such a manner as to narrow the recessed portion 30A relative to the connecting pin 88 within a specified range. By this biasing force, the peripheral surface of the development roller 64 abuts the peripheral surface of the photosensitive drum 16 in the photosensitive body case 84. Moreover, the recessed portion 30A can be extended against the biasing force of the tensile coil spring 90.

In addition, when the recessed portion 30A is narrowed in a specified width, the space between the photosensitive drum 16 and the development roller 64 is kept at a specified close distance by a tracking roller (not shown) disposed coaxially with the photosensitive drum 16.

As shown in FIG. 1, in the laser beam printer 10, a control unit 70 is provided on the upper surface side of the bulkhead 22 oppositely to the cover 28 of the EP cartridge 18. In the lower portion of the frame 24, a high voltage power supply 72 for supplying a power to the electrifying device 60 for electrifying the photosensitive drum 16 is provided adjacently to the laser beam scanning unit 14. The laser scanning unit 14 is partitioned from the high voltage power supply 72 by means of the partitioning wall 74.

The frame 24 will be described in detail below.

As shown in FIG. 2, in the frame 24, thick wall portions 100 to 106 are provided around the bulkhead 22 for thickening the joint portions between the bulkhead 22 and the upright walls 20A to 20D thereby strongly connecting the bulkhead 22 to the upright walls 20A to 20D. Thick wall portions 108 to 114 are provided on the end portions of the joint portions between the upright walls 20A to 20D for reinforcing the frame 24 in co-operation with the above thick wall portions 100 to 106 thereby ensuring the specified rigidity of the frame 24. In addition, each of the thick wall portions 100 to 114 is integrated with the adjacent one.

A rib 116 is formed on the upper surface of the bulkhead 22, reversed to surface on which the partitioning wall 74 is located, along the base portion of the partitioning wall 74. One end of the rib 116 extends to be integrated with the thick wall portion 106 of the upright wall 20D, and the other end extends to be integrated with the base portions of the shading walls 78 and 80 of the bulkhead 22. A rib 118 extends from the base portion of the shading wall 80 to be integrated with the thick wall portion 102 formed between the bulkhead 22 and the upright wall 20B.

Figure 6:
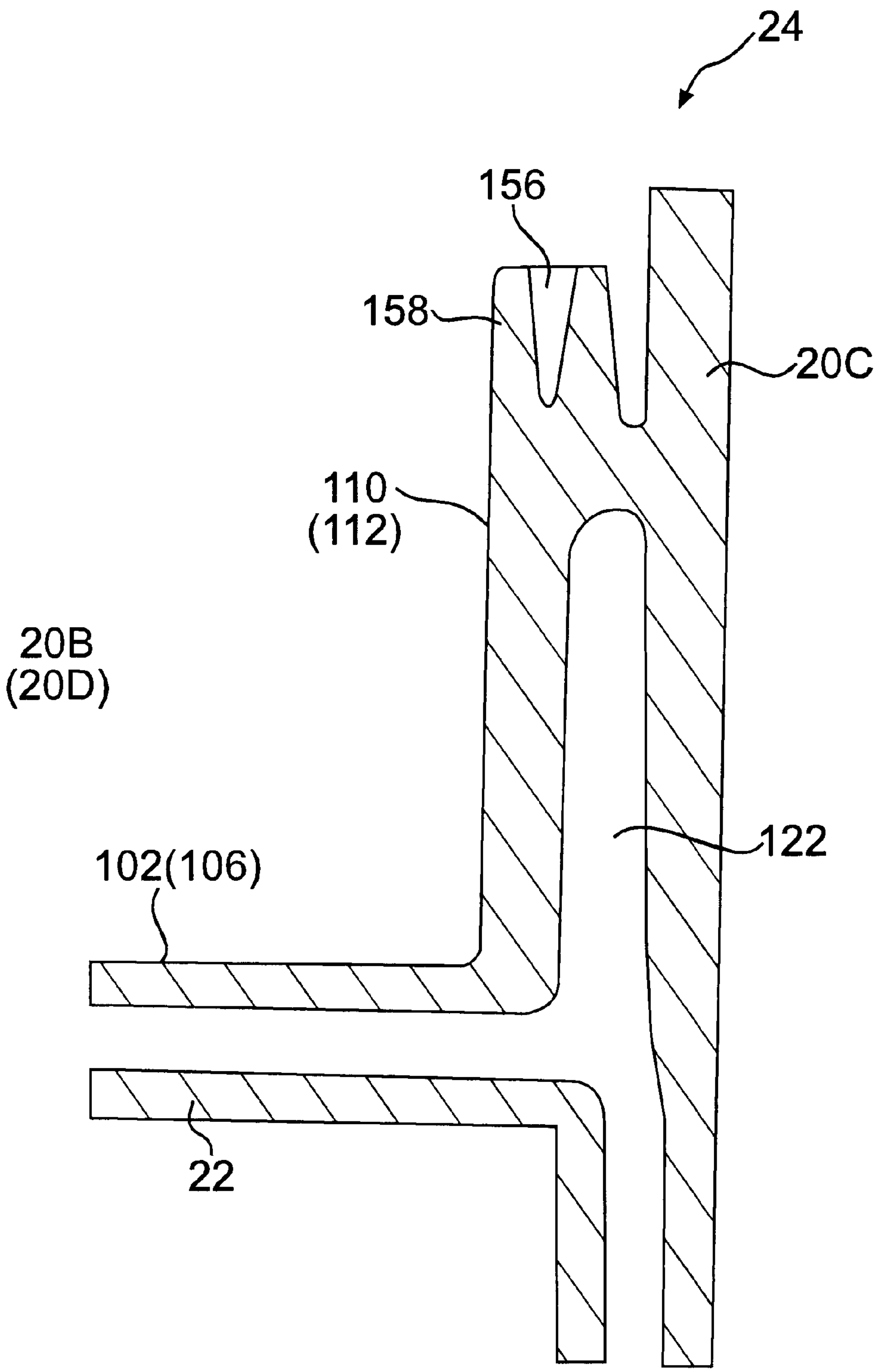
FIG. 6 is an enlarged sectional view taken along line 6—6 of the frame shown in FIG. 2.

As shown also in FIG. 6, boss portions 158 perforated with boss holes 156 are respectively provided at the upper end portions of the thick wall portions 110 and 112 vertically extending on both the sides of the upright wall 20C (on the sides of the upright walls 20B and 20D). A bracket (not shown) for holding the paper supply tray 34 is mounted to each of the boss portions 158 by way of a screw screwed in the boss hole 156.

As shown in FIG. 2, a gate 120 for injecting a fluid such as nitrogen gas (hereinafter, the fluid is represented by nitrogen gas) in a resin at a specified pressure upon molding of the frame 24, is provided at the intermediate portion of the rib 116. Molten resin is poured in a die, and then nitrogen gas is injected in the resin at a specified pressure from the gate 120 with a specified timing. When nitrogen gas is injected from the gate 120 of the rib 116, the resin poured in the die sequentially enters in the portions of the frame 24 which are thicker and relatively slow in the hardening, to push the peripheral resin to the die, thereby tightly pressing the resin to the surface of the die. Nitrogen gas thus enters in the resin while being branched from ribs 116 and 118 to the thicker portions such as thick wall portions 100 to 114.

After the resin is hardened and the molding of the frame 24 is completed, the nitrogen gas is removed. Thus, a continuous cavity 122 is formed in the frame 24. In addition, the kind of fluids injected in the frame 24 and the process of injecting the fluid are determined in accordance with the general gas-assist method. While the detailed explanation is omitted in this embodiment, the injecting pressure of nitrogen gas is determined such that a fluid flows from the gate 120 and is sequentially branched from the ribs 116 and 118 into the thick wall portions 100 to 114 so as not to reduce the thicknesses of the resin at the ribs 116 and 118 and the thick wall portions 100 to 114 so much. A plurality of the gates 120 for injecting nitrogen gas therethrough may be provided.

Figure 5:
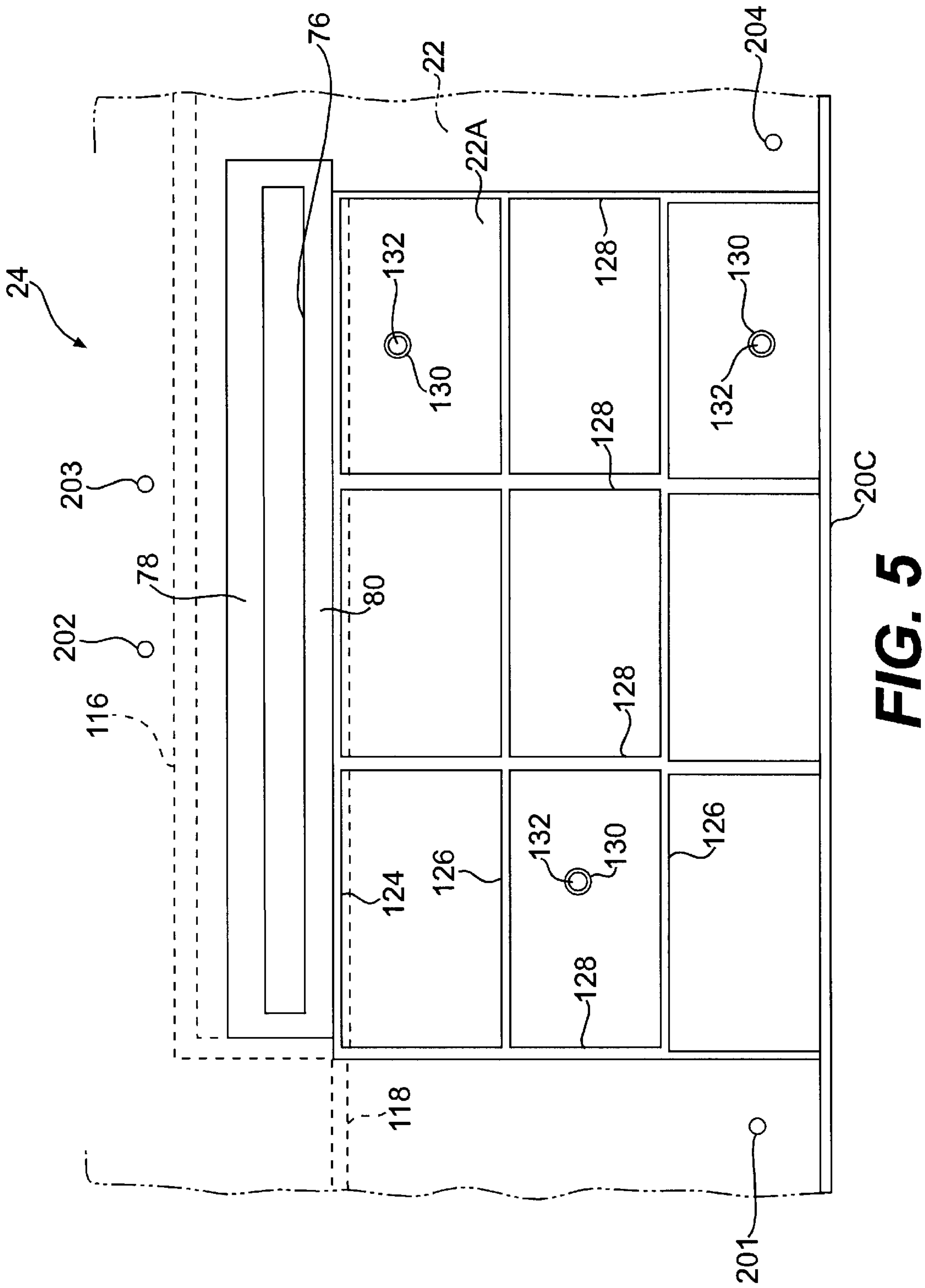
FIG. 5 is an enlarged plan view showing the underside of a bulkhead on which a laser beam scanning unit is to be mounted.

As shown in FIGS. 3 and 5, on the surface of the bulkhead 22 on the side of the laser beam scanning unit 14 (hereinafter, referred to as "mounting surface 22A") for mounting the laser beam scanning unit 14 on the bulkhead 22, a rib 124 extends along the shading wall 80 and a plurality of ribs 126 are formed in parallel to the rib 124 at specified intervals between the rib 124 and the upright wall 20C. In addition, FIG. 5 is a plan view of the bulkhead 22 of the frame 24 as seen from the underside (underside of this paper, in FIG. 1).

A plurality of ribs 128, which are in parallel to each other and extend from the rib 124 to the upright wall 20C, are provided so as to cross the ribs 124 and 126.

On the mounting surface 22A, the section on which the laser beam scanning unit 14 is to be mounted is partitioned and reinforced by the ribs 124, 126 and 128, and a plurality of boss portions 130 (three pieces, in this embodiment) are projectingly provided in the areas partitioned by the ribs 124, 126 and 128. Each of the boss portion 130 is formed on the mounting surface 22A such that the leading edge thereof projects from the ribs 124, 126 and 128 (see FIG. 3). The shading case 82 of the laser beam scanning unit 14 is abutted and mounted on the upper end surfaces of the boss portions 130. In addition, a boss hole 132 is provided in each of the boss portions 130, and a screw (not shown) is screwed in the boss hole 132 for mounting the shading case 82.

The positional relationship between the shading wall 80, and the rib 124 and the rib 118 is shown in FIG. 5. Of the surfaces shown in FIGS. 3 and 5, the surface required for the highest surface accuracy is the leading edge surface of the boss portion 130. For this reason, the boss portion 130 is located at the position separated from the ribs 124, 126 and 128, and the upright wall 20C by a distance of at least 10 mm or more for preventing the deformation due to the residual stress.

Moreover, the rib 124 is positioned directly under the rib 118 being a flow path through which a gas flowing from the gas gate 120 first passes, and it has a width of 2.5 mm and a height of 6 mm. In addition, each of the ribs 126 and 128 has a width of 2.0 mm and a height of 6 mm. The leading edge of the boss portion 130 has an inside diameter of 6 mm, an outside diameter of 8 mm, and a height of 7 mm. Four resin gates are designated at the numerals 201 to 204. As a result of an experiment in which an usual gas injection molding was carried out by injecting nitrogen gas from the gas gate 120 under the above condition, the flatness of the leading end surfaces of the boss portions 130 at the three points become 0.02 mm.

Figure 7:
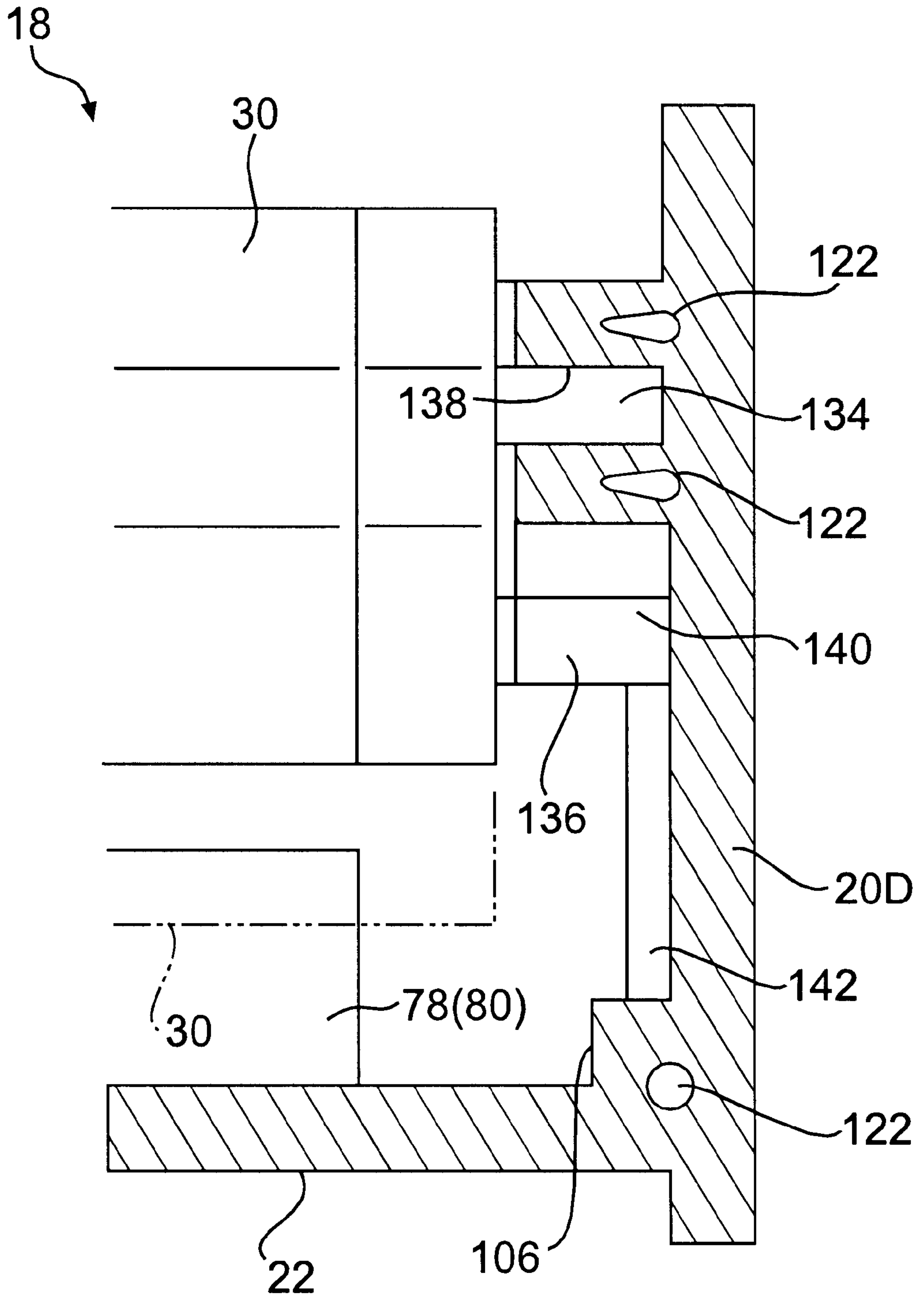
FIG. 7 is an enlarged sectional view taken along line 7—7 of FIG. 2.

As shown in FIGS. 2 and 7, a bracket 136 for holding one of supporting shafts (only one is shown in FIG. 1) provided at both the ends of the EP cartridge 18 is projectingly provided on the upright wall 20D adjacent to the opening/closing cover 28 at a specified height. A guide groove 138 having a width being approximately similar to that of the supporting shaft 134 is provided in the bracket 136 so as to opened from the end portion thereof on the side of the opening/closing cover 28. The other end portion of the guide groove 138 opposed to the side of the opening/closing cover 28 is bent downward to the shading wall 78 and extend up to a specified position for forming a holding portion 140 for holding the supporting shaft 134. A rib 142 is provided on the bracket 136 so as to extend from the thick wall portion 106 provided at the joint portion between the bulkhead 22 and the upright wall 20D. Nitrogen gas is injected into the rib 142 upon molding of the frame 24.

As shown in FIG. 2, on the upright wall 20B opposed to the upright wall 20D, there are projectingly provided both a rib 144 substantially vertically extending along the upright wall 20B from the thick wall portion 102, and a rib 146 substantially perpendicular to the rib 144. Nitrogen gas is also injected into the ribs 144 and 146. On the upright wall 20B, boss portions 148 are projectingly provided on the areas divided by the ribs 144 and 146. A drive unit 150 for supplying a drive power to the EP cartridge 18 is mounted on these boss portions 148. A guide groove 152, which is opposed to the guide groove 138 and holds the other supporting shaft 134 of the EP cartridge 18, is provided in the drive unit 150.

As shown in FIG. 4, a spring 160 as a biasing/holding means is provided in the holding portion 140 formed integrally with each of the guide grooves 138 and 152. In the spring 160, one end engages with a pin 162; the intermediate portion is wound around a shaft pin 164; and the other end abuts a pin 166 provided over each of the guide grooves 138 and 152. The spring 160 is biased counterclockwise, that is, in the direction of allowing the end portion on the side of the pin 166 to abut the pin 166 relative to the shaft pin 164. The spring 160 has a bent portion 168 projecting toward the holding portion 140, between the pin 166 and the shaft pin 164.

When the EP cartridge 18 is inserted in the frame 24 such that each of the supporting shafts 134 is fitted in each of the guide grooves 138 and 152 and inserted in the holding portion 140, the supporting shaft 134 first abuts the bent portion 168 of the spring 160 on the side of the pin 166. Subsequently, as the EP cartridge 18 is further pressed in the frame 24 against the biasing force of the spring 160, the abutment position of the supporting shaft 134 against the spring 160 is shifted to the shaft pin 164, and when it exceeds the bent portion 168, the biasing force of the spring 160 is changed to introduce the supporting shaft 134 to the holding portion 140. Thus, the supporting shaft 134 is guided from each of the guide grooves 138 and 152 to the holding portion 140 by the biasing force of the spring 160. Namely, the spring 160 biases the supporting shaft 134 toward the holding portion 140 on the side of the shaft pin 164 relative to the bent portion 168 (lower side of the paper surface, in FIG. 4); and it also biases the supporting shaft 134 to the side of the opening/closing cover 28 along each of the guide grooves 138 and 152 on the side of the pin 166 relative to the bent portion 168 (left side of the paper surface in FIG. 4).

The EP cartridge 18 is thus mounted such that the supporting shafts 134 are contained in the holding portions 140 (see FIGS. 1 and 3). At this time, the shading walls 78 and 80 enter in the recessed portion 30A of the shading case 30, and the photosensitive body case 84 and the development unit case 86 hold the shading walls 78 and 80 by the biasing force of the tensile coil spring 90.

On the frame 24, a projecting portion 170 is provided at the position opposed to the lower side (lower side of the paper surface, in FIG. 4) of the development unit case 86 of the EP cartridge 18 near the holding portion 140. When the photosensitive body case 84 of the EP cartridge 18 is lifted upward around the supporting shafts 134 contained in the holding portions 140, the projecting portion 170 abuts the lower surface side of the development unit case 86 opposed to the photosensitive body case 84 relative to the supporting shaft 134.

Accordingly, by the lifting of the photosensitive body case 84 of the EP cartridge 18, the supporting shafts 134 can be lifted against the biasing force of the spring 160 around the projecting portion 170 with a relatively small force. Moreover, by the abutment of the supporting shaft 134 thus lifted against the spring 160 on the side of the pin 166 relative to the bent portion 168, the supporting shaft 134 is biased to the side of the opening/closing cover 28 along each of the guide grooves 138 and 152. At this time, the photosensitive body case 84 and the development unit case 86 of the EP cartridge 18 are turned around the connecting pin 88 against the biasing force of the tensile coil spring 90 in the direction of extending the recessed portion 30A. The shading walls 78 and 80 can be thus simply removed from the recessed portion 30A between the photosensitive body case 84 and the development unit case 86.

A microswitch 154 (shown only in FIG. 8) is mounted on the frame 24 at a specified position. When the EP cartridge 18 is mounted at the specified position, for example, a portion (or a projecting portion provided to correspond to the microswitch 154) of the shading case 30 of the EP cartridge 18 abuts the operating lever of the microswitch 154, thus switching the internal contact in the microswitch 154.

As shown in FIG. 8, the microswitch 154 is connected between the laser drive circuit 50 and the semiconductor laser 52 of the laser beam scanning unit 14. When the EP cartridge 18 is mounted at the specified position, the internal contact of the microswitch 154 is closed, so that a drive power is supplied from the laser drive circuit 50 to the semiconductor laser 52 for preparing the emissive state of a laser beam.

In the laser beam printer 10, the photosensitive drum 16 provided in the EP cartridge 18 is rotated in the direction of the arrow A. When the rotated photosensitive drum 16 passes through the cleaning unit 68 and the electrifying device 60, the outer peripheral portion of the photosensitive drum 16 is uniformly electrified and then positioned oppositely to the recessed portion 30A. A laser beam is emitted on the basis of an image signal from the laser beam scanning unit 14 into the recessed portion 30A. The outer peripheral portion of the photosensitive drum 16 is sequentially formed with an electrostatic latent image by the laser beam, and is then positioned oppositely to the development unit 62. In the development unit 62, it is formed with a toner image corresponding to the electrostatic latent image by the toner supplied from the development roller 64, and is then moved to the transfer roller 66.

A recording paper sheet 32 is supplied between the photosensitive drum 16 and the transfer roller 66 from the paper supply tray 34. The toner of the photosensitive drum 16 is sequentially transferred on the recording paper sheet 32, thus forming a toner image corresponding to the electrostatic latent image formed on the photosensitive drum 16 on the recording paper sheet 32.

The recording paper sheet 32 is then fed to the fixing unit 46, being heated and fixed with a toner image by the fixing rollers 44, and is discharged to the paper discharge tray 38, thus obtaining the recording paper sheet 32 formed with the toner image according to the laser beam.

In the laser beam printer 10, the frame 24 forming the casing 12 is reinforced by the thick wall portions 100 to 114 and a plurality of ribs 116 and 118; accordingly, the frame 24 can be significantly reduced in weight without lowering of the rigidity as compared with the frame made of a resin added with glass fiber. Since nitrogen gas or the like is infected in the resin from the gate 120 at a specified pressure upon molding of the frame 24 thereby tightly pressing the resin against the die, it becomes possible to prevent the generation of shrinkage and hence to mold the frame with a high accuracy. The fluid injected in the molten resin upon molding is removed after the molding thereby forming the cavity 122 in the thick portions of the frame 24, so that the frame 24 can be further reduced in weight, and further it can be strengthened by the formation of a closed sectional shape without reduction in the thickness of the frame 24.

Since the frame is molded of a resin which does not substantially contain glass fiber, the surface of the die is prevented from being damaged and the frequent replacement of the die can be eliminated. Moreover, the resin substantially added with no glass fiber can be finished into the shape corresponding to the die with a high accuracy, so that the frame 24 can be used for part of the casing 12 serving as the appearance of the laser beam printer 10. This eliminates the necessity of additionally providing a casing for covering the whole frame 24, thus reducing the size of the apparatus and significantly lowering the manufacturing cost.

In the frame 24, manufactured at a low cost without reduction in the rigidity, parts such as the laser beam scanning unit 14 and the paper supply tray 34 are disposed, and then the EP cartridge is mounted, thus completing the assemble of the apparatus. At this time, the mounting surface 22A of the bulkhead 22 for mounting the shading case 82 of the laser beam scanning unit 14 is reinforced by a plurality of ribs 124 to 128, and further it is molded with a high accuracy by injecting nitrogen gas in the ribs 124 to 128 for pressing the mounting surface 22A to the die, so that even the leading edges of the boss portions 130 formed on the mounting surface 22A can be finished with a high accuracy.

Accordingly, it becomes possible to suppress the height difference between the surfaces of the leading edges of the boss portions 130 of the mounting surface 22A within the range of about 0.03 mm or less where the laser beam scanning unit 14 can be mounted so as not to exert adverse effect on the image formed on the photosensitive drum 16.

The ribs 144 and 146 are provided around the boss portions 148 of the upright wall 20B on which the drive unit 150 is to be mounted; accordingly, the drive unit 150 can be mounted at the accurate position, like the laser beam scanning unit 14.

The boss portions 158 are provided on the upper end portions of the thick wall portions 110 and 112 on both the sides of the upright wall 20C. Each of these boss portions 158 is formed in an accurate shape at the accurate position by the nitrogen gas injected in the thick wall portions 110 and 112. Accordingly, the components such as the paper supply tray 34 can be simply and accurately mounted on the boss portions 158. These boss portions 158 are provided not to project from the upright wall 20C and the like but provided at the end portions of the thick wall portions 110 and 112. This prevents the generation of shrinkage liable to be generated at the frame 24 by provision of the boss portions 158. Moreover, for example, in the case where the boss portions 158 are provided so as to project from the upright wall 20C and the like, they are applied with a load along the surface of the upright wall 20C thereby tending to damage the base portions of the boss portions 158 on the side of the upright wall 20C. On the contrary, in this embodiment, the thick wall portions 110 and 112 can receive the load applied to the boss portions 158 as a whole, which makes it possible to hold the paper supply tray 34 more strongly.

In this embodiment, the boss portions 158 for mounting parts are formed on the upper end portions of the thick wall portions 110 and 112; however, they may be formed on the other thickness wall portions 108 to 114, as needed.

In this way, each of parts can be accurately and strongly mounted on the frame 24, so that the assembly of the laser beam printer 10 is made significantly easy.

Into the laser printer 10 where each part is mounted and assembled with a high accuracy, the EP cartridge 18 is mounted by opening the opening/closing cover 28. The EP cartridge 18 is pressed in the apparatus while the supporting shafts 134 at both the ends are inserted in the guide grooves 138 and 152. The EP cartridge 18 is guided by the guide grooves 138 and 152 to come near the bulkhead 22, and is mounted in the state that the supporting shafts 134 are contained in the holding portions 140.

Specifically, the supporting shaft 134 of the EP cartridge 18 abuts the spring 160 projecting to the supporting portion 140 on the side of the pin 166 relative to the bent portion 168. Subsequently, when the spring 160 is pressed-in against the biasing force of the spring 160, the abutment position of the supporting shaft 134 against the spring 160 is shifted on the side of the shaft pin 164. When passing through the bent portion 168, the supporting shaft 134 is pressed into the holding portion 140 by the biasing force of the spring 160, and it is held in the holding portion 140 by the biasing force of the spring 160.

By the movement of the supporting shafts 134 of the EP cartridge 18 into the holding portions 140, the EP cartridge 18 is moved to the side of the bulkhead 22 of the frame 24, and the shading walls 78 and 80 of the bulkhead 22 enter in the recessed portion 30A provided in the shading case 30 of the EP cartridge 18. At this time, the shading walls 78 and 80 enter in the recessed portion 30A while expanding the photosensitive body case 84 and the development unit case 86 of the EP cartridge 18 against the biasing force of the tensile coil spring 90. After the shading walls 78 and 80 enter in the recessed portion 30A, the photosensitive case 84 and the development unit case 86 are tightly abutted against each other by the biasing force of the tensile coil spring 90.

Thus, the optical path of a laser beam between the photosensitive drum 16 of the EP cartridge 18 and the laser beam scanning unit 14 can be shielded. At this time, since the shading walls 78 and 80 are accurately formed by the ribs 116 provided near the shading walls 78 and 80, the optical path of a laser beam can be tightly shielded by the shading walls 78 and 80 and the shading case 30, and further, the EP cartridge 18 can be accurately positioned by the guide grooves 138 and 152 and the holding portions 140. Moreover, when the supporting shaft 134 exceeds the bent portion 168 of the spring 160, an operator obtains a relatively light feeling at the hand holding the EP cartridge 18, and certainly feels that the EP cartridge 18 is positively mounted at the specified position, thus obtaining the comfortable feeling of mounting of the EP cartridge 18.

When the EP cartridge 18 is accurately mounted at the specified position, the microswitch 154 is operated so that the laser beam scanning unit 14 prepares the emissive state of a laser beam.

In the case where the EP cartridge 18 is removed from the laser beam printer 10 for maintenance or the like, the opening/closing cover 28 of the casing 12 is first opened. The interior of the casing 12 is thus opened; however, the optical path of a laser beam is tightly shielded by the bulkhead 22 and the shading walls 78 and 80 of the frame 24 and the shading case 30 (mainly photosensitive body case 84) of the EP cartridge 18. Consequently, even if the laser beam scanning unit 14 is operated, the laser beam can be prevented from being leaked.

When the photosensitive body case 84, which is the end portion of the EP cartridge 18 on the side of the opening/closing cover 28, is lifted in such a state, the development case 86 opposed to the photosensitive body case 84 relative to the supporting shafts 134 abuts the projecting portion 170, and the supporting shafts 134 can be lifted around the abutment portion between the development unit case 86 and the protecting portion 170. At this time, the photosensitive body case 84 and the development unit case 86 of the EP cartridge 18 are turned around the connecting pin 88 against the biasing force of the tensile coil spring 90 in the direction of expanding the recessed portion 30A.

The supporting shaft 134 of the EP cartridge 18 thus lifted is shifted, at the abutment position against the spring 160, on the side of the pin 166 while pushing up the bent portion 168 of the spring 160 against the biasing force of the spring 160. When the supporting shaft 134 reaches the side of the pin 166 relative to the bent portion 168 by the movement of the abutment position of the supporting shaft 134, the biasing force of the spring 160 acts to push out the supporting shaft 134 to the side of the opening/closing cover 28 along each of the guide grooves 138 and 152. The EP cartridge 18 can be removed from the opening of the opening/closing cover 28 along the biasing force of the spring 160.

The ejecting work of the EP cartridge 18 is performed by use of the position most apart from the position at which the EP cartridge 18 is lifted as a fulcrum, so that the EP cartridge 18 can be lifted with a relatively light force.

On the other hand, this apparatus has the double safety structure, wherein the microswitch 154 is operated to open the internal contact when the EP cartridge 18 is removed, thereby cutting-off the supply of a power from the laser drive circuit 50 to the semiconductor laser 52 in the laser beam scanning unit 14. Accordingly, the laser beam carelessly emitted can be certainly prevented from being leaked from the space between the shading case 30 of the EP cartridge 18 and the shading walls 78 and 80.

In this embodiment, the leakage of a laser beam in the frame 24 is prevented by the shading case 30 of the EP cartridge 18 and the shading walls 78 and 80 provided in the frame 24. Moreover, there is provided the double safety structure of stopping the operation of the laser beam scanning unit 14 when the EP cartridge 18 is removed. As a result, it becomes possible to certainly prevent the careless leakage of a laser beam, and hence to safely perform the maintenance of the apparatus.

In the case where a safety interlock which acts in co-operation with the opening/closing cover 28 is provided in the apparatus, it is required to provide a complex mechanism of interlocking the opening/closing cover 28 with a shutter and to ensure a space for containing the shutter in the apparatus. On the contrary, in the laser beam printer 10 of this embodiment, such a complex interlocking mechanism and the space for containing the shutter are eliminated. This reduces the size of the apparatus with a simple structure, and prevents the increase in the weight due to the provision of such a mechanism.

In addition, the construction of the image formation apparatus of the present invention is not limited to the laser beam printer 10 of this embodiment. For example, as for the laser beam scanning unit, the polygonal mirror 54 may be replaced by a galvanometer or an acousto-optical deflector. Moreover, the photosensitive cartridge may be so constructed that the photosensitive body is integrally provided with a member which at least constitutes a partial process of forming an electrostatic latent image or developed image, and the interior of the apparatus is openable by removal of the photosensitive body together with this member.

The frame 24 used in this embodiment is only illustrative, and the construction of the present invention is not limited thereto. The thick wall portion and the rib may be designed according to the shape of the frame.

In this embodiment, the EP cartridge 18 is divided into the photosensitive body case 84 and the development unit case 86; however, the division method and the processing members contained in the divided cases are not limited to those in this embodiment. The spring 160 is not limited in its shape of the biasing means and the like, and may be designed using the optimal shape and member, as needed.

The present invention is not limited to the laser beam printer 10, and may be applied to a general image formation apparatus using an electrophotographic process of forming an electrostatic latent image on a photosensitive body by exposing it to a scanned laser beam and forming a specified image from the electrostatic latent image using processing members.

As described above, in the image formation apparatus of the present invention, it becomes possible to significantly reduce the size and weight of the apparatus. Specifically, the frame is formed of a resin containing glass fiber in an amount of 10% or less, that is, substantially containing no glass fiber, without reduction in rigidity, so that the weight of the apparatus can be reduced. Moreover, the use of such a resin prolongs the depreciation of a die for molding the frame, and significantly reduces the manufacturing cost.

In addition, since the photosensitive cartridge is guided and held in the holding portions by a biasing/holding means, it can be accurately and simply mounted and ejected.

What is claimed is:

1. An image forming apparatus providing support for image forming elements including an optical scanning unit, comprising;

a frame for supporting the image forming elements, including the optical scanning unit, said frame defined by a continuous member and formed of resin containing glass fibers in an amount of 10% or less by weight;

said member having rigidity increasing reinforcement formations; and said rigidity increasing reinforcement formations having a continuous hollow interior to increase the rigidity of said frame.

2. An image forming apparatus as recited in claim 1, wherein said reinforcement formations are gas assisted injection molded.

3. An image forming apparatus as recited in claim 1, wherein said frame comprises wall surface members joined together, said rigidity-increasing reinforcement formations being positioned where the wall surface members are joined together, said rigidity-increasing reinforcement formations having a boss or hole for mounting the image forming elements.

4. An image forming apparatus as recited in claim 1, wherein the optical scanning unit comprises a laser beam scanning unit and a photosensitive body around which a plurality of processing members are positioned and has a first shading member for containing the photosensitive body together with at least one of the processing members; and wherein said frame further comprises a second shading member for shielding, in co-operation with the first shading member, a laser beam from the laser beam scanning unit from the photosensitive member when the optical scanning unit is mounted at a specific position, and a support reinforcement formation positioned in proximity to the second shading member.

5. An image forming apparatus as recited in claim 3, wherein the frame further comprises a holding formation, having a continuous hollow interior, for holding said optical scanning unit at a specified position in the frame, said holding formation projecting inwardly on said frame.

6. An image forming apparatus as recited in claim 4, wherein said holding formation includes a guide groove for guiding the optical scanning unit into said frame during mounting and removal of the optical scanning unit, and said groove includes a retaining formation to retain the optical scanning unit when mounted within the frame;

the frame further comprises a projection formation positioned perpendicular to the guide groove; and a biasing means positioned adjacent to said holding formation for containing and holding by a biasing force the optical scanning unit when positioned in said holding formation, and biasing the optical scanning unit when the optical scanning unit is abutted against said projection formation and the optical scanning unit is lifted against the biasing force, opposite the projection formation.

7. An image forming apparatus as recited in claims 4, 5 or 6, wherein the optical scanning unit comprises first and second parts rotatably connected to each other; and the frame further comprises a biasing member for biasing the first and second parts of the optical scanning unit so as to hold the second shading member between the first and second parts of the optical scanning unit.

* * * * *